(12) United States Patent
Umstead et al.

(10) Patent No.: US 6,573,446 B1
(45) Date of Patent: Jun. 3, 2003

(54) APPARATUS FOR MOUNTING AN ELECTRICAL COMPONENT ON A STRUCTURE

(76) Inventors: George H. Umstead, 803 Park Blvd., Altoona, PA (US) 16601; Steven M. Umstead, Rd. 2 Box 610B, Tyrone, PA (US) 16686

( * ) Notice: Subject to any disclaimer, the term of this patent is extended or adjusted under 35 U.S.C. 154(b) by 0 days.

(21) Appl. No.: 09/447,784

(22) Filed: Nov. 23, 1999

(51) Int. Cl.[7] ............................................. H01J 15/00
(52) U.S. Cl. ........................ 174/50; 174/58; 220/4.02; 248/900
(58) Field of Search ............................. 174/48, 50, 58, 174/60; 220/3.3, 3.6, 3.8, 4.02; 248/906

(56) References Cited

U.S. PATENT DOCUMENTS

| | | | | |
|---|---|---|---|---|
| 3,620,404 A | * | 11/1971 | Grasso | 174/48 X |
| 3,622,029 A | * | 11/1971 | Ware | 174/57 X |
| 3,928,716 A | * | 12/1975 | Marrero | 174/57 |
| 3,977,640 A | * | 8/1976 | Arnold et al. | 174/58 X |
| 4,019,647 A | * | 4/1977 | Arnold | 174/58 X |
| 4,483,453 A | * | 11/1984 | Smolik | 220/3.5 |
| 4,971,280 A | * | 11/1990 | Rinderer | 248/906 X |
| 5,025,944 A | * | 6/1991 | Rodick | 220/3.3 |

* cited by examiner

Primary Examiner—Dean A. Reichard
Assistant Examiner—Dhiru R. Patel
(74) Attorney, Agent, or Firm—James Ray & Associates

(57) ABSTRACT

A installation system for mounting electrical receptacle boxes within a building structure. The electrical receptacle box has at least one of a front contact positioning device for contacting the front wall surface of a wall and a rear contact positioning device for contacting the rear surface of the wall to thereby position the electrical receptacle box with respect to the wall. A bracket for mounting the electrical receptacle box to a structural member includes a clamping bracket which exerts a clamping force on opposing faces of the structural component and is slidable along the length of the structural component before being fixedly secured thereto. Preferably, the clamping bracket includes an adjustable biasing portion which is deflectable to define a variable clamping gap.

38 Claims, 11 Drawing Sheets

APPARATUS FOR MOUNTING AN ELECTRICAL COMPONENT ON A STRUCTURE

CROSS REFERENCES TO RELATED PATENTS

The present application is directed to similar subject matter as is described in U.S. Pat. No. 5,841,068 entitled "Mounting Device for Mounting an Electrical Component in a Wall" and issued on Nov. 24, 1998 to Umstead et al.

FIELD OF THE INVENTION

The present invention relates, in general, to an installation system for mounting electrical components, most particularly electrical receptacle boxes in a building structure. The installation system described allows an electrician to carry a relatively small inventory of parts into the field and yet be equipped for installing electrical receptacle boxes in a variety of situations.

More particularly, the present invention relates to a system for mounting electrical receptacle boxes within a building so that the electrical receptacle box is positioned with its open face substantially flush with a surface (e.g., a wall, ceiling, floor, etc.) of the building.

The present invention has applicability to both "new work" (e.g., completely new construction) and "old work" (e.g., remodeling or retrofitting already existing construction).

BACKGROUND OF THE INVENTION

So-called "electrical receptacle boxes" (often referred to as simply "receptacle boxes" or "outlet boxes") are used in all types of building construction for housing electrical components such as switches and electrical outlets. Typically, such electrical receptacle boxes are mounted within the walls of the structure and are attached to a structural component such as a wall stud (or occasionally to a floor or ceiling joist) by some sort of bracket. Typically, the brackets used require the installing electrician to hold the bracket to the stud with one hand while driving the attaching nails or screws with the other hand. The installed electrical receptacle box must often align with a particular aperture provided in the wall surface itself, which may be drywall, plaster, etc. It can prove difficult to achieve adequate alignment. Moreover, the depth of the installed electrical receptacle box should be such that it aligns more or less flush with the wall surface and does not protrude or be recessed with respect thereto.

DESCRIPTION OF THE RELATED ART

U.S. Pat. No. 5,025,944 issued to Rodick relates to an outlet assembly for mounting electrical communication interface equipment and wiring to a wall stud. A pair of electrical receptacles are spot welded at their side portions to leg members formed contiguously at a ninety degree angle to a connecting member. The assembly is secured by screws or other fastening means through the connecting member to the front surface of the wall stud.

U.S. Pat. No. 4,971,280 issued to Rinderer relates to a two part clip for attachment to a metal wall stud and for connecting an electrical box thereto.

U.S. Pat. No. 4,747,506 issued to Stuchlik, III relates to an outlet box mounting assembly having an electrical outlet box which is uniquely configured to attach to a similarly uniquely shaped mounting bracket. Edge projections provided on the outlet box are slidingly received in slots provided on the bracket, and when a boss provided on the outlet box engages an aperture provided on the bracket, further sliding travel between the two components is prevented.

U.S. Pat. No. 4,019,647 issued to Arnold relates to an electrical wiring box having a pair of mounting elements attached thereto for use in mounting the wiring box within an opening in a supporting structure such as wallboard or paneling. The wiring box includes first and second mounting portions, each having a pair of spaced slots therein. Each of the mounting elements includes a pair of locking tabs and a flat portion having openings therein connected with the locking tabs. The locking tabs are adapted to be inserted into the pair of slots in the corresponding one of the mounting portions for attaching the mounting element to the wiring box. The flat portion is adapted to receive fasteners in the openings therein for mounting the wiring box to a supporting structure.

U.S. Pat. No. 3,997,640 to Arnold et al. relates to metal mounting brackets for mounting electrical wiring boxes to studs, particularly metal studs. The metal mounting brackets are generally Z-shaped and have a generally U-shaped pair of stud embracing members and a pair of tabs with stud-biting teeth provided thereon. The installer arranges the bracket so that the pair of U-shaped members embrace a first corner region of the stud. The installer then uses adjustable pliers to bend the tabs around a second curved corner region of the stud and cause the teeth associated with the tabs to bite into a second corner region of the stud.

U.S. Pat. No. 3,928,716 issued to Marrero relates to an electrical outlet box having a mounting bracket which is mountable on the studding of a building and a separate wiring box having substantially conventional forward-facing outlet openings. The wiring box is slidably receivable on a track-and-rail system into the mounting bracket so that the assembly can be mounted on a stud prior to the installation of wallboard, and after an access opening is cut into the installed wallboard, the wiring box can be slid out into the opening until the front faces is flush with the front surface of the wall board and then locked at that position.

U.S. Pat. No. 3,622,029 to Ware relates to an electrical outlet box having a first portion for receiving electrical outlets, switches, cover plates and the like of standard size and a second portion telescopically associated with the first portion for increasing the interior volume of the box for accommodating electrical wires.

OBJECTS OF THE INVENTION

One object of the present invention is the provision of an installation system for an electrical receptacle box which will allow an electrician/installer to carry a relatively small inventory of parts and yet be equipped to install electrical receptacle boxes in both new work and old work situations.

Another object of the present invention is the provision of an electrical receptacle box which is provided with at least one (and preferably both) of a front contact positioning device and a rear contact positioning device for positioning the depth of the electrical receptacle box with respect to the wall surface.

A further object of the present invention is the provision of an electrical receptacle box of such a type which is easy for the installer/electrician to install in a wall aperture and position with respect to the wall surface.

Yet another object of the present invention is the provision of such an electrical receptacle box which can be used to install electrical components in both new work (i.e., new construction) as well as old work (i.e., already existing construction).

A further object of the present invention is the provision of an electrical receptacle box of the type described which is inexpensively and readily manufactured.

A still further object of the present invention is the provision of a clamping bracket for attaching an electrical receptacle box to a structural component (e.g., a wall stud) of a structure, the clamping bracket exerting a sufficient clamping force on the structural component to allow the installer/electrician to subsequently fixedly attach the clamping bracket to the structural component without having to hold the bracket in place during this step.

Yet another object of the present invention is the provision of such a clamping bracket which can be adjusted along the length of the structural component while still maintaining the aforementioned clamping force, thereby easily allowing positional adjustments to be made prior to the affixing step.

A yet further object of the present invention is the provision of such a clamping bracket which can be easily adjusted to accommodate structural components of varying widths while still maintaining the aforementioned clamping force.

A still further object of the present invention is the provision of such a clamping bracket which can be easily adjusted by the installer/electrician in the field for both wood and metal studs of varying widths.

Yet another object of the present invention is the provision such a clamping bracket which allows an offset to be maintained between the supporting structural component and the attached electrical receptacle box, thereby providing clearance for such items as cover plates, plaster rings, etc.

In addition to the objects and advantages of the present invention described above, various other objects and advantages of the invention will become more readily apparent to those persons skilled in the relevant art from the following more detailed description of the invention, particularly when such description is taken in conjunction with the attached drawing Figures and appended claims.

SUMMARY OF THE INVENTION

In one aspect, the invention generally features an electrical receptacle box for mounting in an aperture of a wall member of a structure, the electrical receptacle box being for the receiving and at least partially enclosing of at least one electrical component and for the positioning of the electrical component within the aperture with respect to the wall member of the structure, the wall member of the structure having a front wall surface and a rear wall surface, the electrical receptacle box including a box, the box having a number of box panels interconnected to define and at least partially enclose a chamber for the mounting of the at least one electrical component therein, and a positioning device for positioning the box within the aperture with respect to the wall member, the positioning device including a front contact positioning device for contacting the front wall surface of the wall member to thereby position the box with respect to the wall member and a rear contact positioning device for contacting the rear wall surface of the wall member to thereby position the box with respect to the wall member.

In another aspect, the invention generally features a bracket for mounting an electrical receptacle box to a structure, the bracket including a clamping bracket for engaging opposing faces of a structural component of the structure and for exerting a clamping force on the structural component, the clamping bracket being slidable along the structural component while the clamping bracket exerts the clamping force on the structural component prior to the clamping bracket being fixedly secured to the structural component, the clamping bracket having a first leg member and a second leg member opposing the first leg member, at least a portion of one of the first leg member and second leg member having an adjustable biasing portion, the adjustable biasing portion being deflectable in a direction toward the other of the first leg member and the second leg member to thereby define a variable clamping gap between the adjustable biasing portion and the other of the first leg member and the second leg member, the adjustable biasing portion and the other of the first leg member and the second leg member exerting the clamping force on the structural component, and an attachment device for attaching the electrical receptacle box to the clamping bracket.

In yet another aspect, the invention generally features a device for positioning and subsequent securing of an electrical component to a structure, including a clamping bracket for engaging opposing faces of a structural component of the structure and for exerting a clamping force on the structural component, the clamping bracket being slidable along the structural component while the clamping bracket exerts the clamping force on the structural component prior to the clamping bracket being fixedly secured to the structural component, and an electrical receptacle box for attachment to the clamping bracket and for housing the electrical component, the electrical receptacle box having a first substantially planar face and the clamping bracket having a second substantially planar face for mating with the first substantially planar face of the electrical receptacle box.

The present invention will now be described by way of a particularly preferred embodiment, reference being made to the various Figures of the accompanying drawings, wherein:

DETAILED DESCRIPTION OF THE PREFERRED EMBODIMENT

Figure 1:
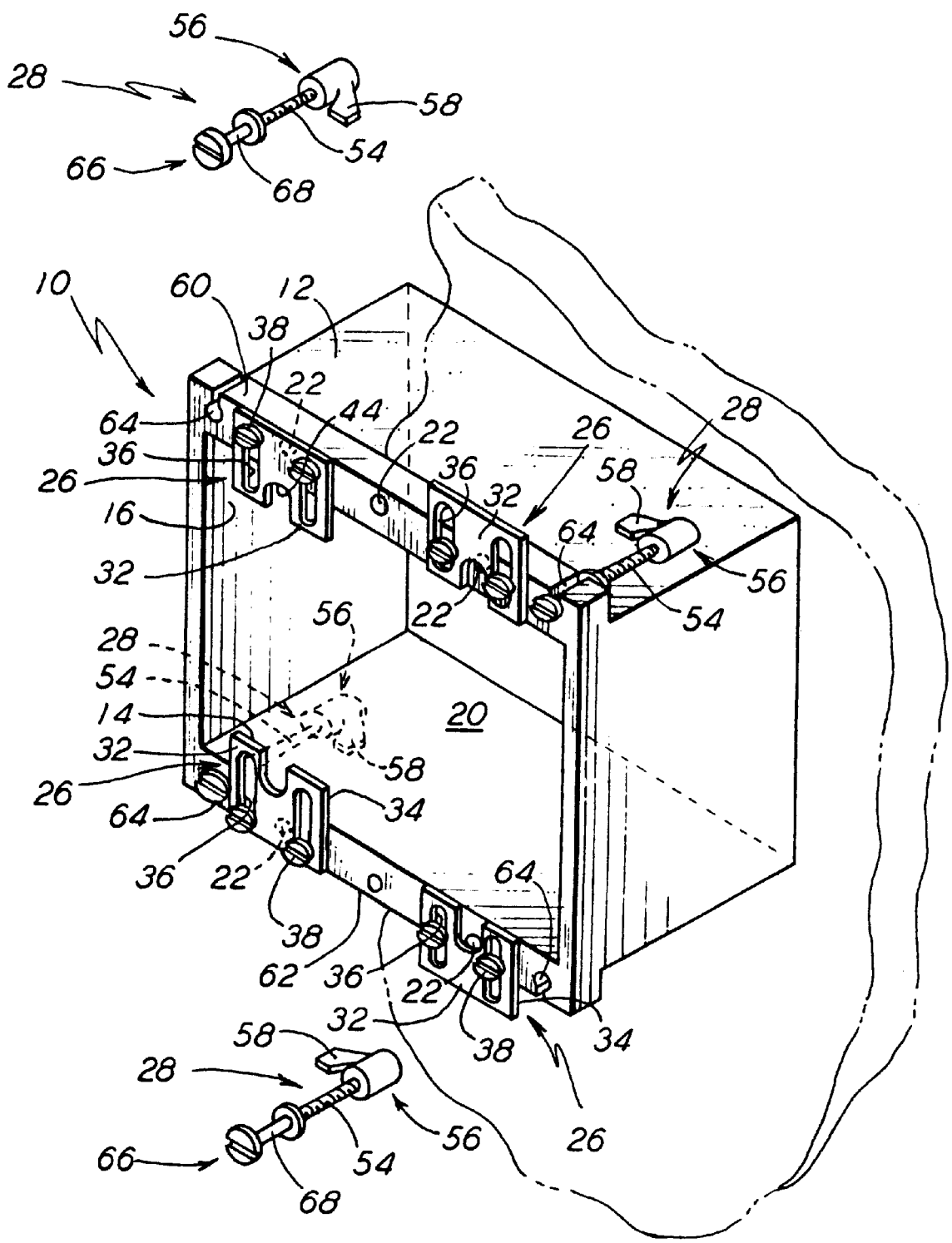
FIG. 1 is a perspective view of a multiple gang electrical receptacle box constructed according to the invention and showing a front contact positioning device and a rear contact positioning device.
Figure 2:
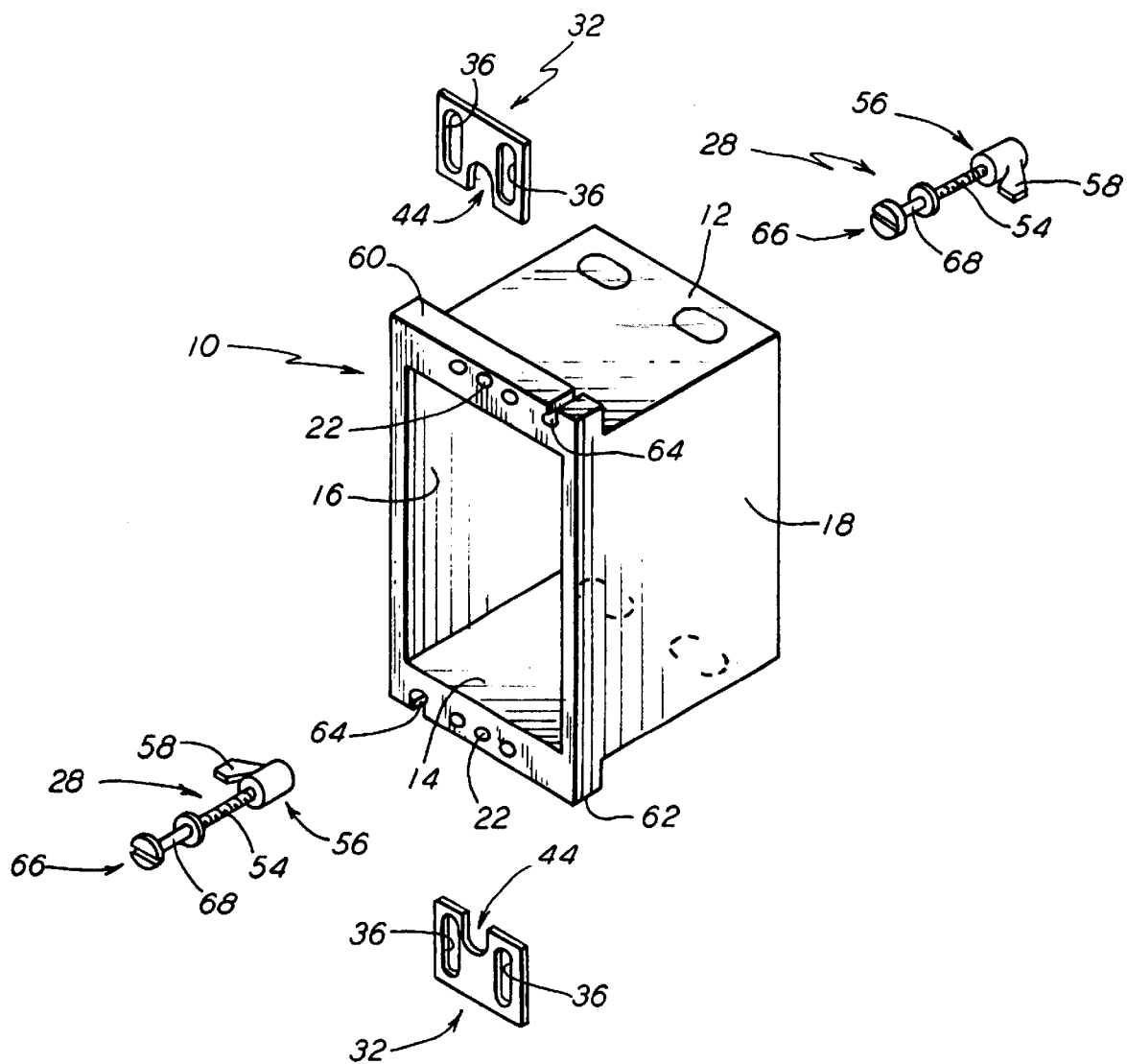
FIG. 2 is an exploded isometric view of a single gang embodiment of the inventive electrical receptacle box.
Figure 3:
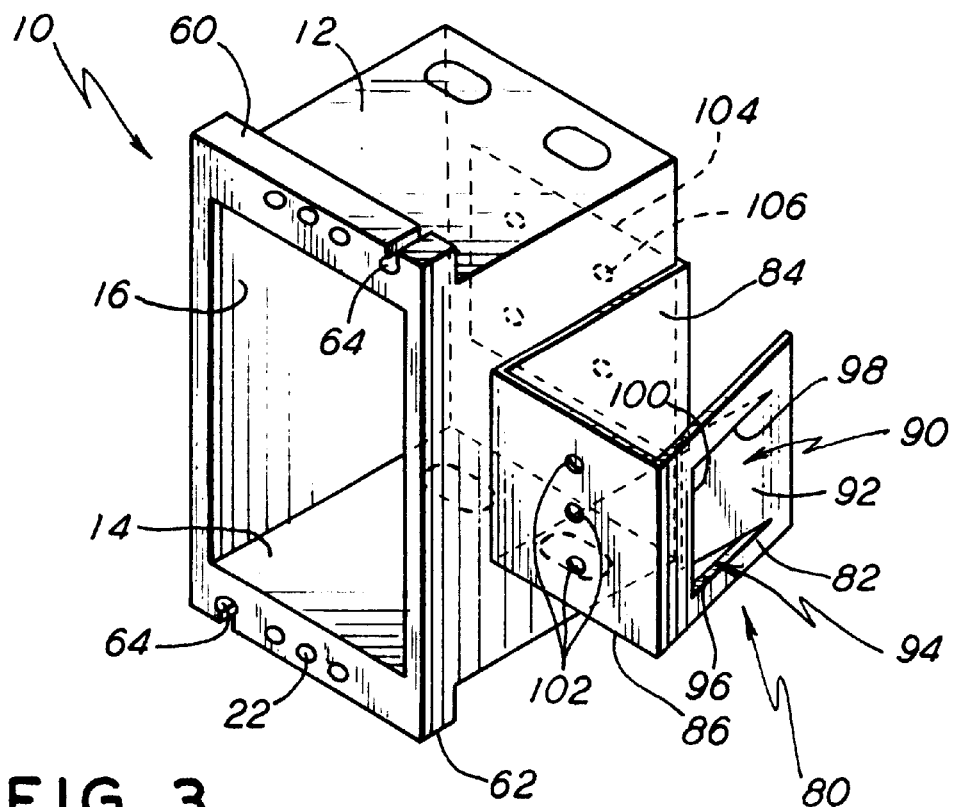
FIG. 3 is an isometric view of a single gang electrical receptacle box according to the invention having an attached mounting clamp provided with an adjustable biasing portion.
Figure 4:
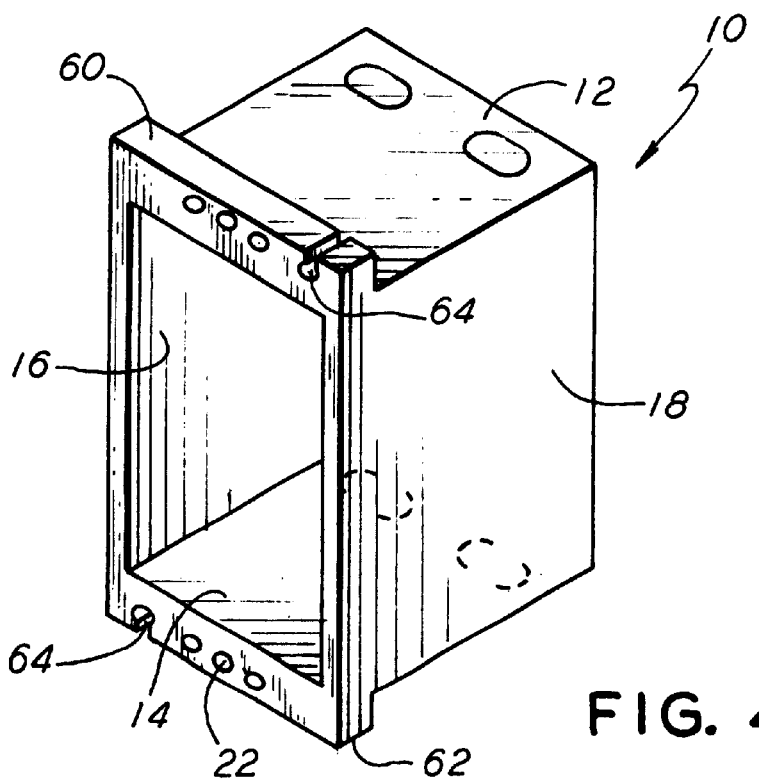
FIG. 4 is an isometric view of a single gang electrical receptacle box according to the invention without the mounting clamp.

Prior to proceeding to a much more detailed description of the present invention, it should be noted that identical components which have identical functions have been identified with identical reference numerals throughout the several views illustrated in the drawing Figures for the sake of clarity and understanding of the invention.

Referring initially to FIG. 1, an electrical receptacle box constructed according to the present invention and generally designated by reference numeral 10 generally includes a top box panel 12, a bottom box panel 14, a first or left box panel 16, and a second or right box panel 18, which are interconnected as shown and preferably arranged to form a rectilinear frame-like configuration. The electrical receptacle box 10 is also preferably provided with a rear box panel 20 but preferably lacks any corresponding front panel so that the general configuration is of a five sided and open faced box-like construction.

It will be understood by those of ordinary skill in field of electrical systems installation that the electrical receptacle box 10 is adapted to receive at least one electrical component for mounting therein, for example, a wall mounted electrical switch or wall mounted electrical outlet. However, the electrical receptacle box 10 may be employed in mounting any number of electrical components in a structure having a planar surface (e.g., wall, ceiling, floor, etc.) where the electrical component is to be mounted so as to be substantially flush with the planar surface.

Electrical components such as electrical switches and electrical outlets are typically mounted within electrical receptacle boxes via a pair of screws, and the electrical receptacle box 10 is provided with matching pairs of holes 22 in the top and bottom box panels 12 and 14, respectively, for accepting such mounting screws.

The electrical receptacle box 10 is adapted and configured to be mounted within a wall member 24 (shown generally in phantom) of a structure such as a building. The task at hand may be either "new work", that is new construction, or "old work", that is remodeling of an existing structure. The electrical receptacle box 10 can be employed in either situation, which significantly reduces the number of parts which an electrician must stock and transport to any given job site.

When the electrical receptacle box 10 is to be employed in new construction (i.e., new work), the electrical receptacle box 10 will typically be mounted to a structural component (e.g., a wall stud, a ceiling joist, etc.) of the structure, and a novel and inventive clamping bracket is described below for such mounting. However, the electrical receptacle box 10 may also be employed in remodeling or retrofitting (i.e., old work). In such cases, the wall 24 is already installed, and a stud is frequently unavailable for the securement of a mounting bracket thereto. Therefore, it is desirable to provide a mechanism for securing the electrical receptacle box 10 directly to the wall 24. Moreover, even in new work, if a multiple gang box is to be installed, it is desirable that the electrical receptacle box 10 be additionally positively secured and positioned with respect to the wall member 24. To both of these ends, the electrical receptacle box 10 is provided with at least one (and preferably both) of a front contact positioning device 26 and a rear contact positioning device 28.

The front contact positioning device 26 is designed to contact a front wall surface 30 of the wall member 24 and therefore position and stabilize the electrical receptacle box 10 with respect to the wall member 24. To this end, the front contact positioning device 26 includes at least one (and preferably two or more) translatable tab members 32 having a wall front contact surface 34. [In FIGS. 1, 2, 7, 13, 14, and 15, a front view of the translatable tab members 32 are shown. The "wall front contact surface" 34 is therefore the opposite surface to that shown, i.e., the surface facing into the drawing page.] Each translatable tab member 32 is translatable between a first position and a second position.

In the first position, when the electrical receptacle box 10 is positioned within the aperture of the wall member 24, each translatable tab member 32 is in a substantially non-contacting relationship with the front wall surface 30 of the wall member 24. In FIG. 1, the two leftmost translatable tab members 32 are depicted in the first position configuration, while, in FIG. 7, the uppermost translatable tab member 32 is depicted in the first position configuration.

Figure 14:
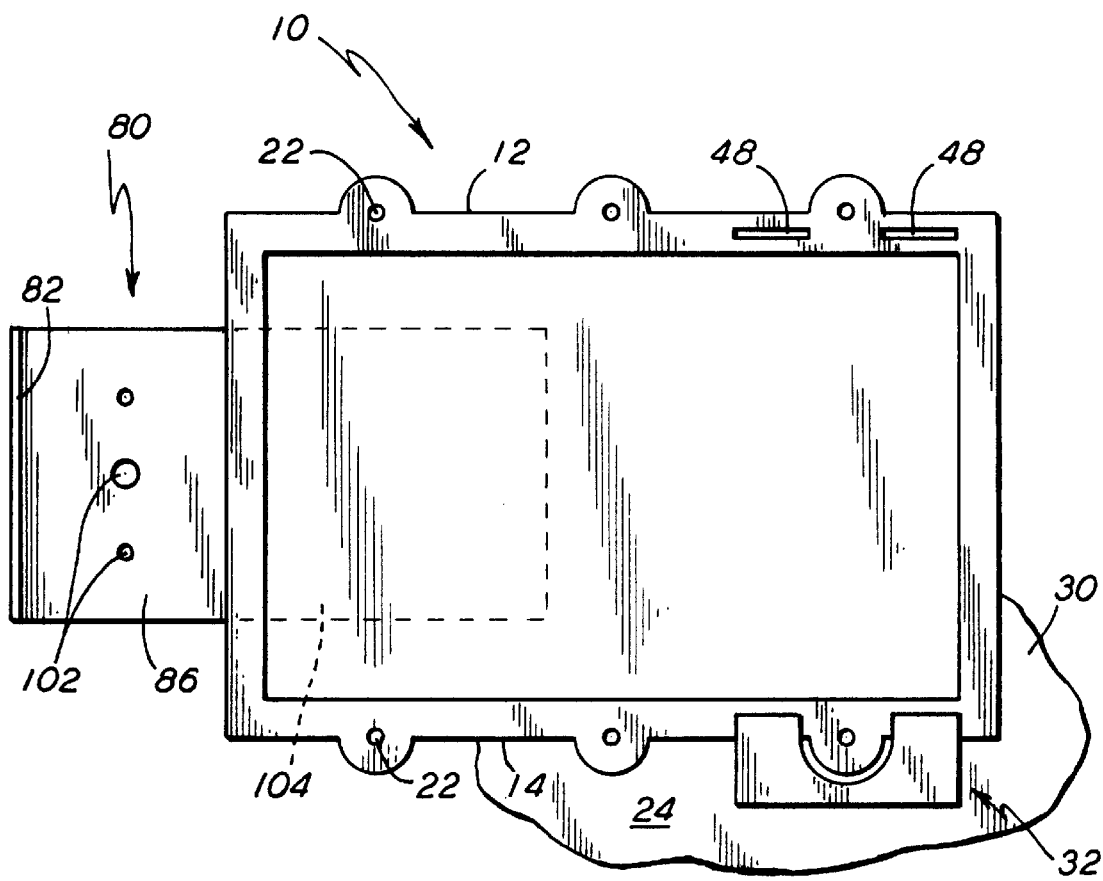
FIG. 14 is a front elevational view of an electrical receptacle box according to the invention showing an alternative embodiment of a front contact positioning device.

In the second position, when the electrical receptacle box 10 is positioned within the aperture of the wall member 24, each translatable tab member 32 is in a substantially contacting relationship with the front wall surface 30 of the wall member 24. In FIG. 1, the two rightmost translatable tab members 32 are depicted in the second position configuration, while, in FIG. 7, the lowermost translatable tab member 32 is depicted in the second position configuration. In FIG. 14, a second embodiment of a translatable tab member 32 is shown in the second substantially contacting position configuration.

It will be seen that the first embodiment of the translatable tab configuration 32 shown in FIGS. 1, 2, 7, and 13 is translatable between the first and second positions in a direction which extends substantially parallel to the front wall surface 30 of the wall member 24. Conversely, in the second embodiment of the translatable tab configuration 32 shown in FIGS. 14 and 15, the translatable tab member 32 is translatable in a direction which extends substantially perpendicular to the front wall surface 30 of the wall member 24.

Figure 16:
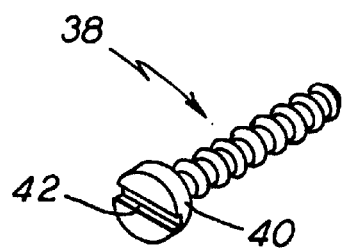
FIG. 16 is an elevational view of a screw used in conjunction with the front contact positioning device shown in FIG. 1.
Figure 17:
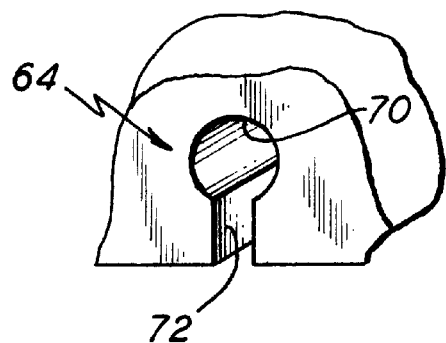
FIG. 17 is an elevational view of a keyhole shaped aperture used in conjunction with the front contact positioning device shown in FIG. 1.

In the first embodiment of the translatable tab member 32 shown in FIGS. 1, 2, 7, and 13, each translatable tab member 32 includes at least one, and preferably at least two, elongated slots 36. Each slot 36 provided in the translatable tab member 32 slidingly engages a pin member 38 which projects from one of the top and bottom box panels 12 and 14, respectively. As seen in FIG. 16, each pin member 38 has an enlarged head portion 40. Each enlarged head portion 40 has a greater radial dimension than the width of the elongated slots 36, thereby trapping the translatable tab members 32 beneath the enlarged head portions 40 of the pin members 38. Preferably, the pin members 38 are provided in the form of screws, most preferably, self tapping screws (e.g., phillips type or slotted type) which include a tool engaging portion 42 and which screw into pilot holes provided on the top and bottom box panels 12 and 14, respectively.

Figure 7:
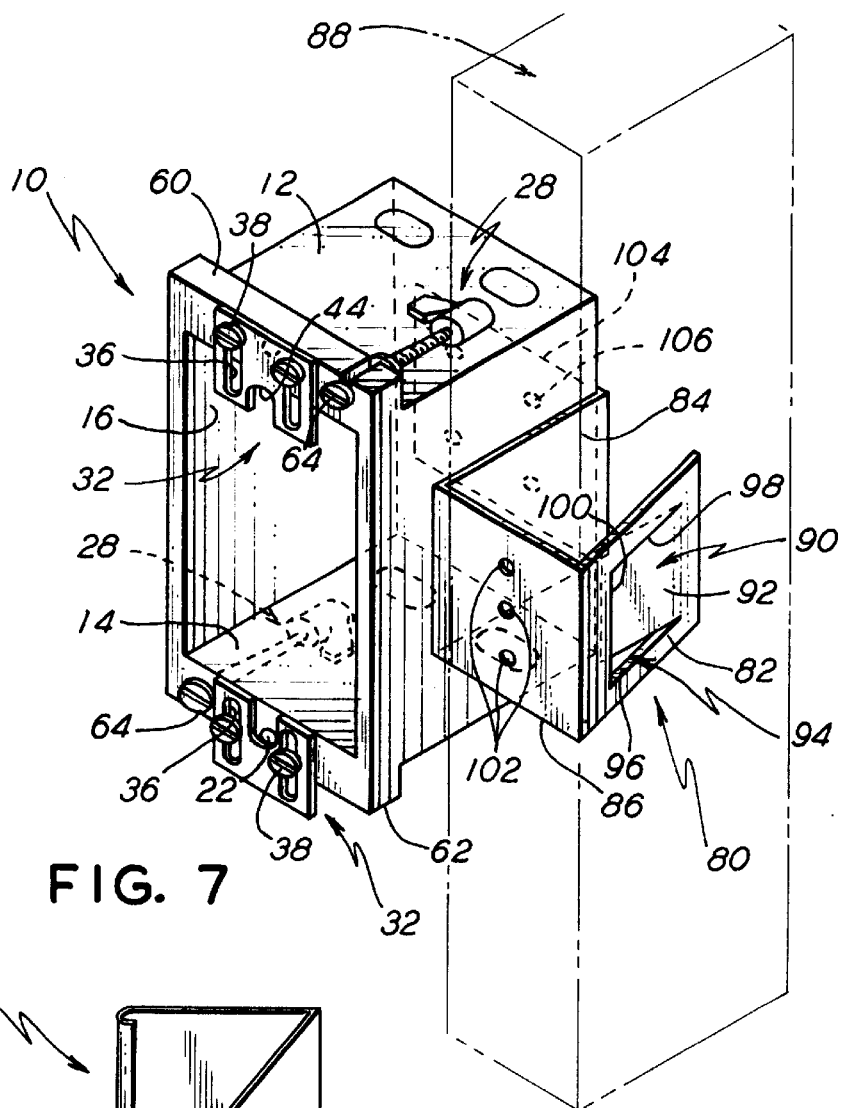
FIG. 7 is an isometric view of a single gang electrical receptacle box according to the invention showing its mounting to a structural component of a structure (e.g., a wall stud) via an attached mounting clamp.

With the construction described and shown, the translatable tab members 32 shown in FIGS. 1 and 7 may be positioned toward the interior of the electrical receptacle box 10 into the first non-contacting position so that the electrical receptacle box 10 can be readily positioned within the aperture provided in the wall member 24. Once in its desired final position, the electrical receptacle box 10 may be positioned relative to the wall member 24 by extending the translatable tab members 32 to the second contacting position, such that the wall front contacting surface 34 of each translatable tab member 32 comes into contact with the front wall surface 30 of the wall member 24. The pin members (i.e., screws) 38 are then tightened to retain the translatable tab members 32 in their extended contacting positions, with the result that the electrical receptacle box is securely positioned with respect to front face 30 of the wall member 24.

As noted above, standard electrical components are normally installed in the electrical receptacle box 10 via matching top and bottom hole pairs 22. Preferably, each translatable tab member 32 is provided with a relieved portion 44 which, in the second extended contacting position, uncovers the holes 22 to allow positive access thereto. However, it should be noted that the relieved portions 44 are not necessary to the invention, as a relative thicker dimensioning of the top and bottom box panels 12 and 14 and proper placement of the holes 22 thereon can eliminate the necessity to provide a relieved portion 44. Preferably, when provided, the relieved portions 44 are of semicircular shape as shown.

Figure 15:
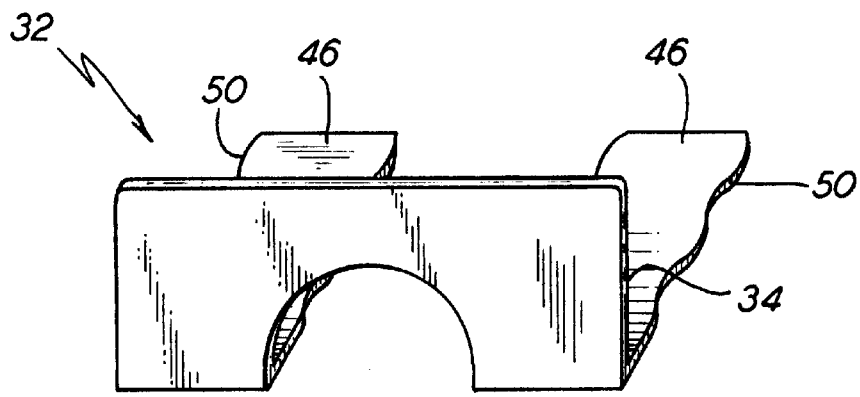
FIG. 15 is an isometric view of a pronged tab member used in conjunction with the front contact positioning device shown in FIG. 14.

In the second embodiment of the front contact positioning device 26 shown in FIGS. 14 and 15, the translatable tab member 32 is provided with at least one (and preferably two) prong members 46. The translatable tab member 32 of the second embodiment also includes a wall front contact surface 34 which, in FIGS. 14 and 15 is the reverse side of the upright surface shown (i.e., the surface facing into the drawing Figure). The prong members 46 extend perpendicular to the wall front contact surface 34 and are dimensioned to slidingly engage and coact with a pair of slots 48 formed in the top and bottom box panels 12 and 14. With the prong members 46 withdrawn from the slots 48 (that is, with the translatable tab members 32 removed and separated from the electrical receptacle box 10), the electrical receptacle box 10 has a reduced profile and can easily be inserted and positioned within an appropriate aperture provided in the wall member 24. The electrical receptacle box 10 may be then positively positioned with respect to the front face 30 of the wall member 24 by the insertion of the prong members 46 into the respective slots 48 such that the contacting surfaces 34 of the translatable tab members 32 come into contact with the front face 30 of the wall member 24. To maintain the translatable tab members 32 in this position, each prong member 46 is preferably provided with a corrugated or wavy surface 50 which, once inserted into a slot 48, deforms and substantially prevents withdrawal therefrom.

The rear contact positioning device 28, which serves to position the electrical receptacle box 10 with respect to a rear surface 52 of the wall member 24 generally includes a threaded member 54 (most preferably a self tapping screw) and a rear contacting member 56. The threaded member 54 passes through one of the top and bottom box panels 12 and 14, it rotatable with respect thereto, and extends substantially parallel to the respective top and/or bottom box panel 12, 14. The rear contacting member 56 is provided with a wing portion 58 which extends transversely outward from the threaded member 54.

It will be seen that each of the threaded members 54 is positioned such that it lies somewhat interior of the left and right box faces 16 and 18. In the case of a single gang electrical receptacle box 10 shown, for example, in FIG. 2, a rear contact positioning device 28 is positioned at each of the upper right and lower left corners of the electrical receptacle box 10. Due to the spacing of the threaded members 54 from the left and right box faces 16 and 18, a normal clockwise rotation of the threaded members 54 will cause the rear contacting members 56 to rotate at most 180 degrees before they are prevented from further rotation by the top and bottom box panels 12 and 14. At this point, the rear contacting members 56, prevented from any further free rotation, are therefore forced to advance on the threads of the threaded member 54 toward the front of the electrical receptacle box 10. As each rear contacting member 56 advances on the threaded member 54, it comes into contact and is forced against the rear surface 52 of the wall member 24. This rear contacting action acts to position and stabilize the electrical receptacle box 10 with respect to the wall member 24.

Figure 5:
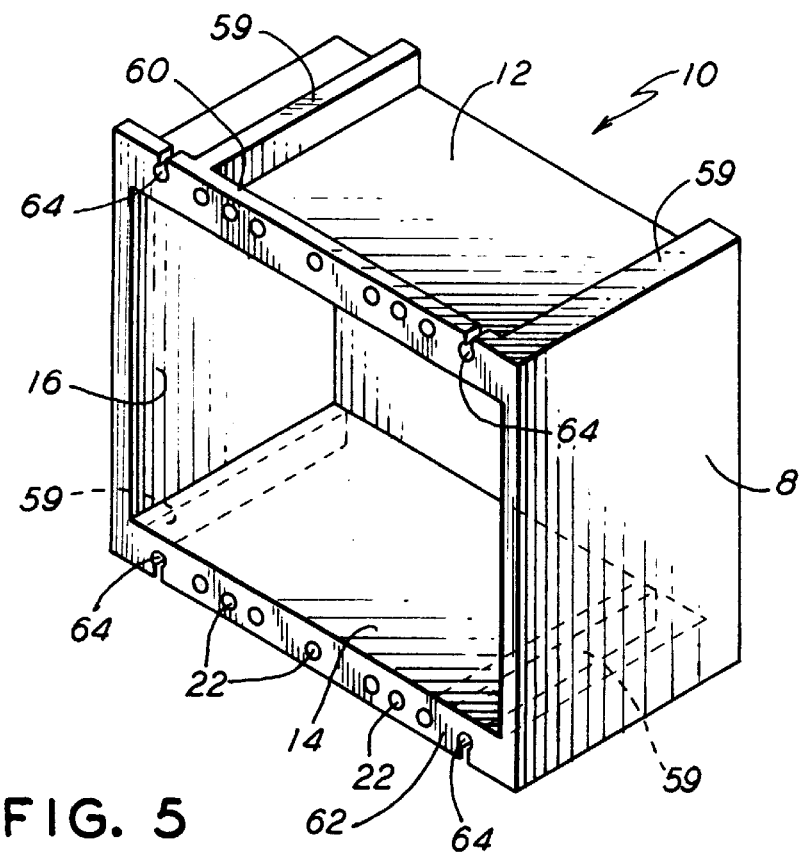
FIG. 5 is a perspective view of a multiple gang electrical receptacle box according to the invention standing alone, without the mounting clamp and without a front contact positioning device or a rear contact positioning device.
Figure 6:
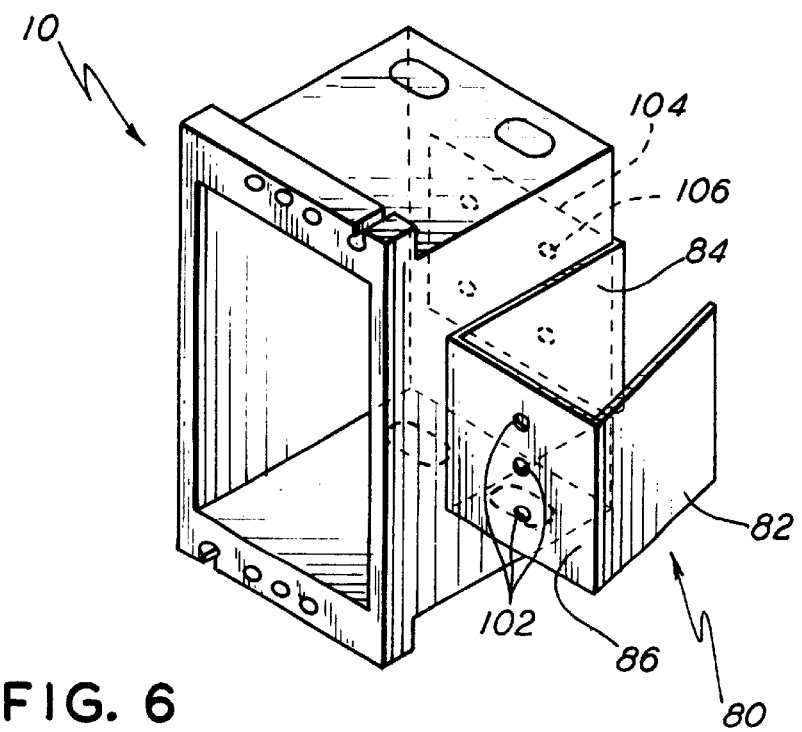
FIG. 6 is an isometric view of a single gang electrical receptacle box according to the invention having an alternative embodiment of a mounting clamp attached thereto.

In the case of a multiple gang electrical receptacle box 10, it may prove desirable to furnish all four corners of the electrical receptacle box 10 with a rear contact positioning device 28. In such a case, the natural clockwise rotation of the threaded members 54 would serve to position the wing portion 58 of the upper left and lower right devices toward the interior of the electrical receptacle box 10. Additionally, even in the case of single gang boxes, it may be desired to ensure that the wing portions 58 align in a substantially upright position with respect to the top and bottom box panels 12 and 14. In such case a raised bead 59 may be provided adjacent to each of the threaded members 54 as is shown in FIG. 5. The raised bead 59 extends outward from the respective top and bottom box panel 12 and 14 and need extend toward the rear of the electrical receptacle box 10 only as far as the threaded member 54 itself extends. Each raised bead 59 is positioned to an immediate side of the respective threaded member 54 such that a natural clockwise rotation of the threaded member 54 will cause the respective wing portion 58 to impinge upon the raised bead 59 thereby retaining the wing portion 58 in a substantially upstanding position (i.e., substantially at 90 degrees with respect to the top or bottom box panel 12 and 14).

In order to provide a surface for the threaded member to engage, the top panel 12 is furnished with an outstanding top flange 60, and the bottom panel 14 is furnished with a similarly configured outstanding bottom flange 62. Each threaded member 54 may be provided most simply in the form of a screw which passes through a simple hole provided in the top and bottom flanges 60 and 62. However, the present inventors have discovered that a more efficient arrangement is to furnish each of the top and bottom flanges 60 and 62 with a keyhole shaped aperture 64 for each of the threaded member 54 and to provide each threaded member 54 with a spool shaped portion 66 having a substantially cylindrical exterior surface 68. As seen most clearly in FIG. 18, each keyhole shaped aperture 64 includes a substantially cylindrical portion 70 and a slot portion 72 which connects the substantially cylindrical portion 70 to an exterior edge of the respective top and bottom flange 60 and 62. The electrical receptacle box 10 is preferably constructed for the most part from a material which has some degree of elasticity such as plastic or a relatively pliable metal and, therefore, the spool portion 66 may be snapably inserted through the slot portion 72 so that the substantially cylindrical exterior surface 68 of the spool portion 66 rotatably engages the substantially cylindrical portion 70 of the keyhole shaped aperture 64. This particular arrangement allows the electrical receptacle box 10 to be manufactured without the extra steps of separately inserting each threaded member 54 through an aperture and then attaching a rear contacting member 56 thereto. Additionally, the installing electrician need not perform such steps in the field, if the rear contacting devices 28 have not already been pre-installed. Instead, each rear contacting device 28 may be merely snapably inserted into the appropriate keyhole shaped aperture 64, resulting in a considerable time savings. It will be appreciated that the spool portion 66 may, of course, also be provided in the form of a separate flange member which is rotatable with respect to the threaded member 54 but which nonrotatably engages the flange 60.

As noted above, the front contact positioning device 26 and the rear contact positioning device 28 both serve to position the electrical receptacle box with respect to the wall member 24 but are nevertheless preferably employed in conjunction with a novel and inventive clamping bracket which serves to even more positively position the electrical receptacle box 10 by attachment to a structural component (e.g., a wall stud or floor or ceiling joist) of the structure. Such a clamping bracket is shown in FIGS. 3, 6–11, 14, and 18–20, to which we now turn.

Figure 19:
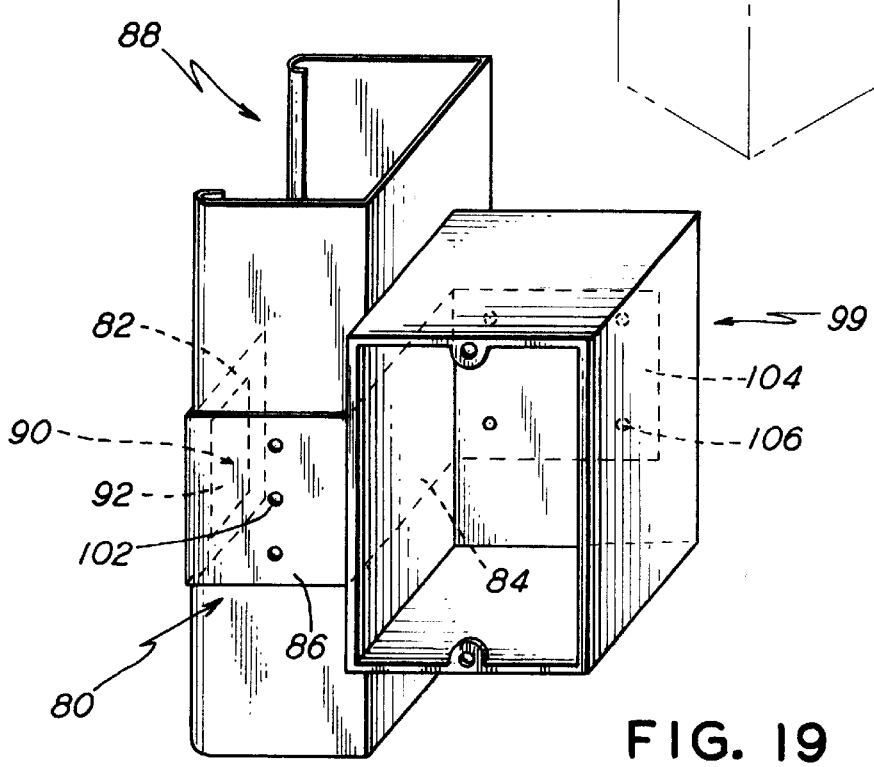
FIG. 19 is an isometric view of the mounting clamp of FIG. 18, again attached to a generic single gang electrical receptacle box and again having a fragmented portion for adjusting to the width of a metal stud.
Figure 8:
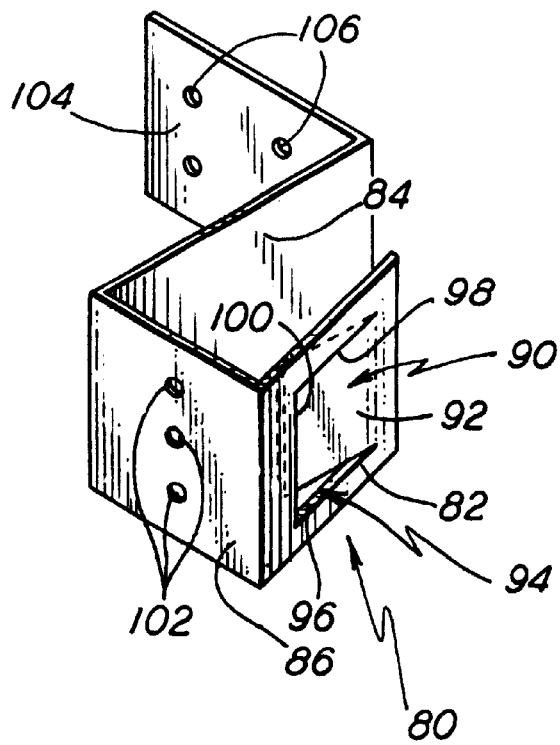
FIG. 8 is an isometric view of a mounting clamp constructed according to the invention.
Figure 9:
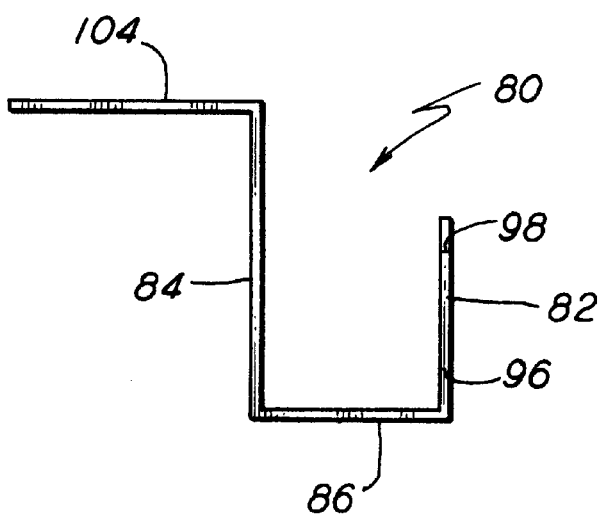
FIG. 9 is a top plan view of the mounting clamp of FIG. 8.
Figure 10:
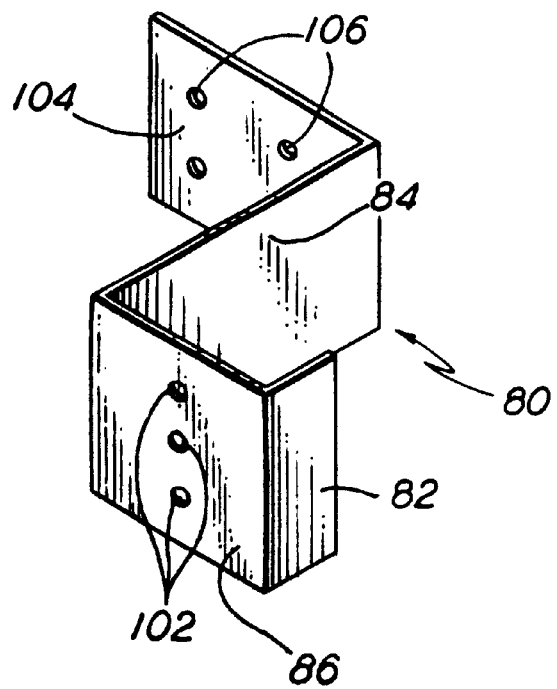
FIG. 10 is an isometric view of an alternative embodiment of a mounting clamp according to the invention.
Figure 11:
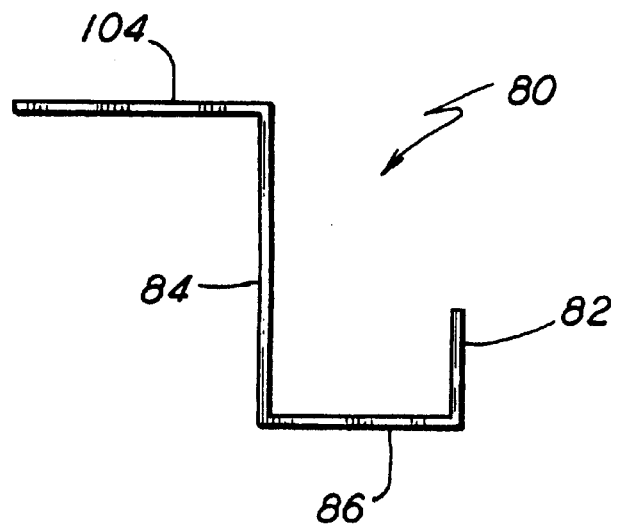
FIG. 11 is a top plan view of the mounting clamp of FIG. 10.
Figure 18:
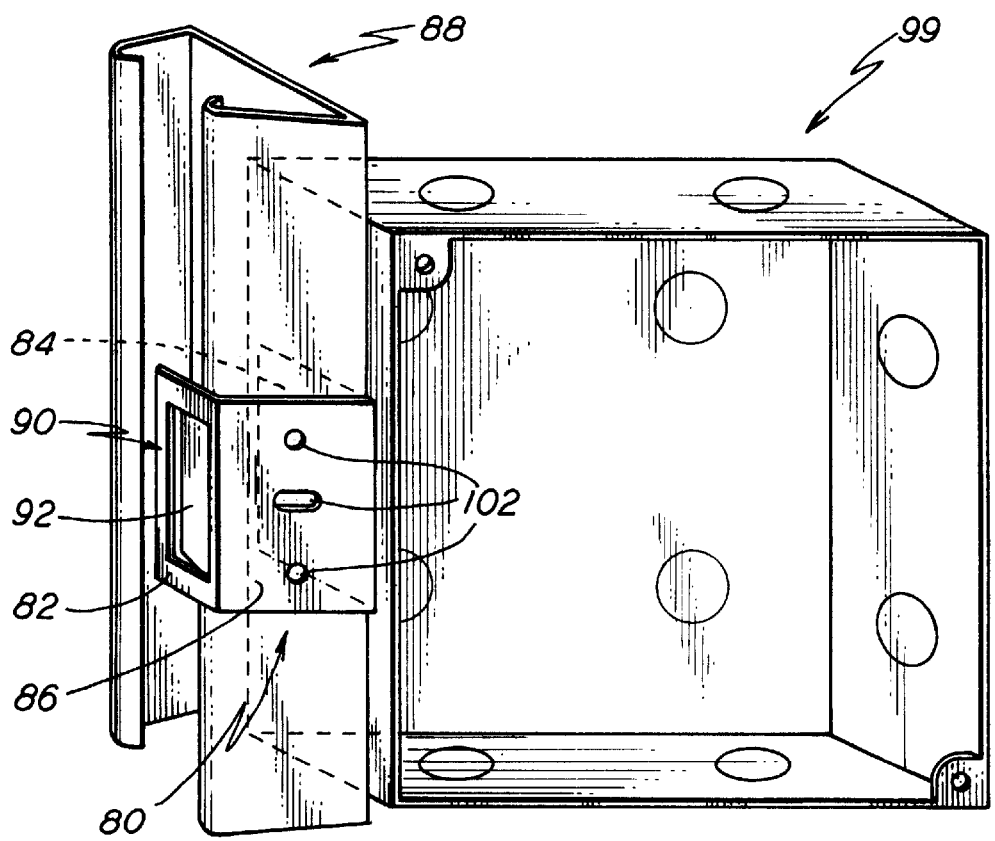
FIG. 18 is a perspective view of a mounting clamp according to the invention clamping a generic multiple gang electrical receptacle box to a metal stud, the mounting clamp having a fragmented portion which acts as an adjustable biasing device for adjusting to the width of the metal stud.
Figure 12:
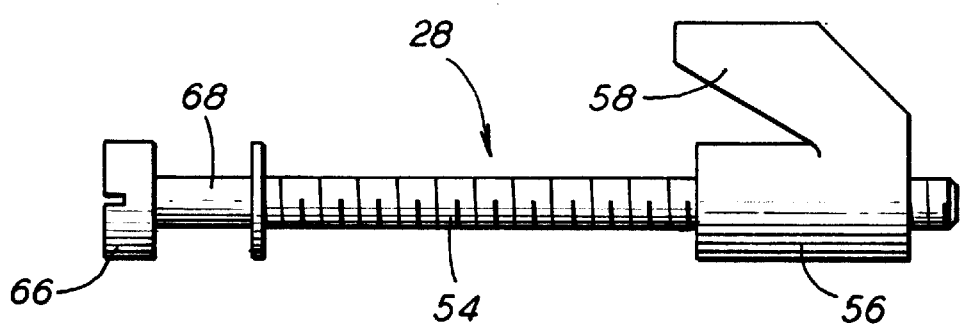
FIG. 12 is an elevational view of a rear contact positioning device for use with an electrical receptacle box constructed according to the invention.
Figure 13:
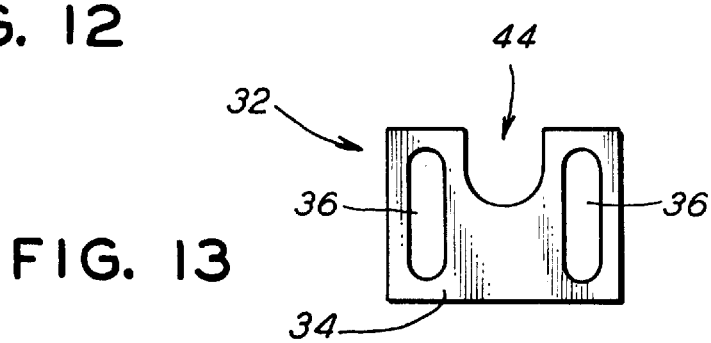
FIG. 13 is an elevational view of a front contact positioning device for use with an electrical receptacle box constructed according to the invention.

A clamping bracket, generally designated by reference numeral 80, includes a first leg member 82, a second leg member 84, and a base portion 86 interconnecting the first and second leg members 82 and 84. The first and second leg members 82 and 84 extend generally perpendicular to the base portion 86 and are therefore oriented in opposition to one another (e.g., generally parallel to one another). The first and second leg members 82 and 84 are, in this disposition, able to engage the opposing faces of a structural component 88. Typically, the structural component 88 will be either a 2" by 4" wooden wall stud 88, as is shown in FIG. 7, or a metal wall stud 88, as is shown in FIGS. 18 and 19. Metal wall studs of the type shown in FIGS. 18 and 19 are being increasingly employed, and the present inventive clamping bracket 80 can be used interchangeably with either wooden or metal wall studs.

Not all wooden wall studs are of the same exact cross sectional measurements. Additionally, the cross sectional measurements of metal wall studs can vary considerably from those of wooden wall studs. In order to allow a singular clamping bracket to be effectively employed with both wooden wall studs of various widths, as well as with metal wall studs, the clamping bracket 80 is most preferably provided with an adjustable biasing portion 90 which can be manually configured by the electrician in the field to cause the clamping bracket 80 to exert an appropriate clamping force on either wooden or metal wall studs, as well as on wooden studs of varying widths. Preferably, the adjustable biasing portion 90 is formed by a fragmented portion 92 of the first leg member 82. More preferably, the fragmented portion 92 is fragmented from the first leg member 82 by a throughgoing cut 94 which passes through the first leg member 82 to thereby partially separate a portion of the first leg member 82. Even more preferably the throughgoing cut 94 includes three separate cut portions: a first cut portion 96, a second cut portion 98 disposed substantially parallel to the first cut portion 96, and a third cut portion 100 which interconnects and is disposed substantially perpendicular to both of the first and second cut portions 96 and 98. While this three cut configuration is the presently preferred embodiment, it will be clear that other configurations, for example, an single arcuate cut, could be substituted.

The fragmented portion 92 partially separated from the first leg member 82 by the first, second, and third cut portions 96, 98, and 100 is deflectable toward and away from the second leg member 84 by the electrician in the field to define a variable clamping gap between the fragmented portion 92 and the second leg member 84. The electrician adjusts this gap such that the clamping bracket 80 exerts a sufficient clamping force on the structural component (e.g., the stud 88) to maintain the clamping bracket 80 and electrical receptacle box attached thereto at the desired height. At this point in the installation, the electrician may release the clamping bracket 80 which will remain positioned due to the clamping action exerted. The clamping bracket 80 and attached electrical receptacle box may then be more permanently affixed to the structural component by driving nails (in the case of wooden studs) or power driven screws (in the case of metal studs) through holes 102 provided in the clamping bracket 80. Preferably, the attachment holes 102 are provided in the base portion 86.

The clamping bracket 80 may be used in conjunction with the electrical receptacle box 10 described above which has either of the front and rear contact positioning devices 26 and 28, and such a configuration is shown in FIGS. 3, 6, 7, and 14. Additionally, the clamping bracket 80 may also be employed in conjunction with more conventional electrical receptacle boxes generically indicated by reference numeral 99 and shown in FIGS. 18 and 19. The clamping bracket 80, in one preferred embodiment, is provided with an additional flange member 104 which extends substantially perpendicularly from the second leg member 84. In this embodiment, the flange member 104 extends behind any attached receptacle box 10 or 99, thereby allowing the receptacle box 10 or 99 to be attached to the flange member, as for example via screw holes 106. However, the clamping bracket 80 need not necessarily include the flange member 104, as shown, for example, in the embodiment of FIGS. 18 and 20, where the flange member 104 is omitted, and the receptacle box 99 is attached directly (e.g., by welding or by monolithic formation) to the second leg member 84.

Figure 20:
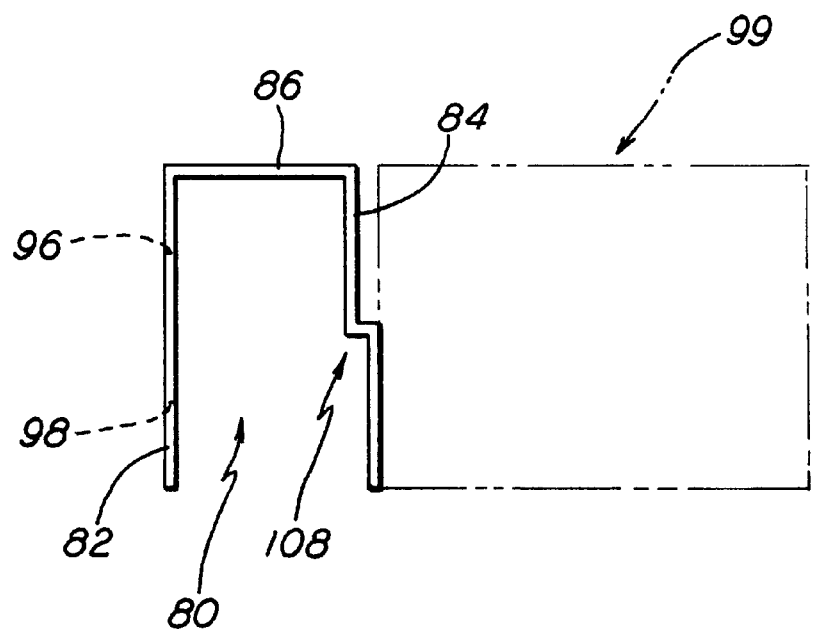
FIG. 20 is a top plan view of an alternative embodiment of a mounting clamp having a fragmented portion and showing an offset device for achieving an offset between an electrical receptacle box and a wall stud.

There are instances where it is desired that some clearance be provided between the receptacle box 99 and the wall stud 88, for example, to provide clearance for a cover plate or plaster ring. FIG. 20 is a top view of an alternative embodiment of the clamping bracket 80 wherein the second leg member 84 is provided with a step 108 so as to provide an offset between the receptacle box 99 and the clamping bracket 80.

Figure 21:
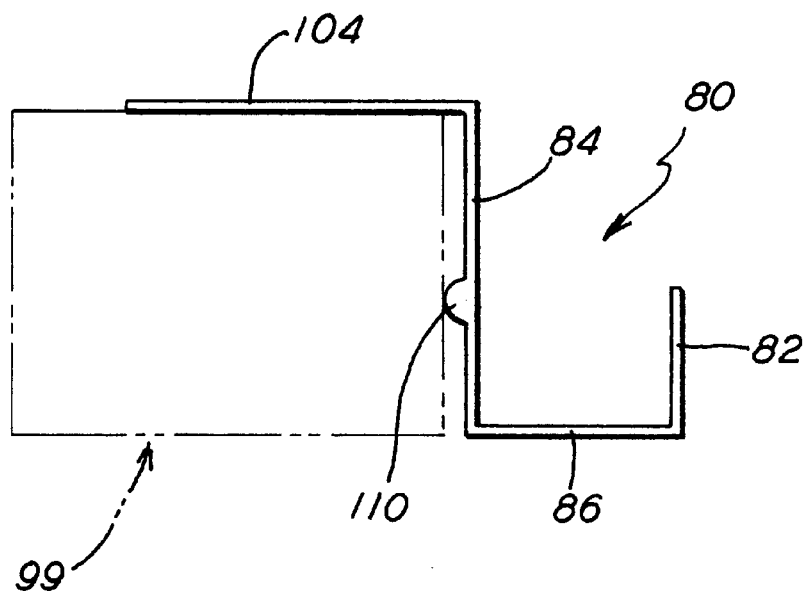
FIG. 21 is a top plan view of a further alternative embodiment of a mounting clamp showing a variation of the offset device for achieving an offset between an electrical receptacle box and a wall stud.

FIG. 21 illustrates a further alternative embodiment of the mounting bracket 80 which again provides for an offset between the second leg member 84 and the receptacle box 99. Here, the second leg member 84 is provided with a nub 110 which serves to position the electrical receptacle box 99 at the desired offset distance from the second leg member 84. In this embodiment, the additional flange member 104 is preferably included to provide a surface for the secure fastening of the electrical receptacle box 99 to the clamping bracket 80.

While it is preferred that the clamping bracket 80 be provided with the fragmented portion 92 in order to accommodate wooden wall studs of varying cross sectional dimensions, the fragmented portion 92 is not absolutely necessary to a proper functioning of the clamping bracket 80. FIGS. 6, 10, 11, and 21, to which we now turn, illustrate embodiments of the clamping bracket where the fragmented portion 92 has been omitted. Here, once again, the clamping bracket 80 includes a first leg member 82, a second leg member 84 oriented substantially parallel to the first leg member 82, and a base portion 86 interconnecting the first and second leg members 82 and 84. The first and second leg members 82 and 84 are in opposition to one another and the distance between them, and thus the length of the base portion 86, is sized such that, when the first and second leg members are placed on opposing faces of a structural component of a structure (e.g., a wall stud or floor or ceiling joist), the first and second leg members 82 and 84 will exert a clamping force on the structural component sufficient to maintain the clamping bracket 80 and attached electrical receptacle box 10 or 99 in place on the structural component. The electrician may then adjust the clamping bracket 80 along the length of the structural component (e.g., a typical 2"×4" stud) prior to finally fixedly attaching the clamping bracket thereto. The step of fixedly attachment may be accomplished by driving nails through the holes 102 provided in the base portion 86. The first and second leg members 82 and 84 are biased toward one another so that they will exert this clamping action on the structural component to maintain the clamping bracket 80 and attached electrical receptacle box 10 or 99 in place, thereby freeing the electrician's hands. Additionally, once placed on the structural component, the clamping bracket 80 and attached electrical receptacle box 10 or 99 may be slid along the length of the structural component for positional adjustment prior to final attachment. The clamping bracket 80 shown in FIGS. 6, 10, and 11 may be optionally provided with the additional flange member 104. This additional flange member 104 is designed to extend behind the electrical receptacle box 10 or 99 and thereby provide one place for attachment of the electrical receptacle box 10 or 99. The additional flange member 104 may be omitted if this proves desirable, since the electrical receptacle box 10 or 99 may be directly attached to the second leg member 84. In this regard, if the clamping bracket 80 and electrical receptacle box 10 or 99 are monolithically formed (for example, as a one piece molded plastic unit), the additional flange member 104 becomes unnecessary.

As shown, the second leg member 84 is preferably configured to have a substantially planar face on its exterior portion. This substantially planar exterior face of second leg member 84 allows it to be mated with any of a number of readily available electrical receptacle boxes 99 which are similarly configured with substantially planar faces on their exterior side walls. The electrical receptacle box 10 according to the present invention is similarly preferably configured with a substantially planar face on at least one of its exterior faces of the first and second box panels 16 and 18 to allow mating with the substantially planar face of the second leg member 84. The attachment between the mounting bracket 80 and the electrical receptacle box 10 or 99 can be accomplished via any commercially well known attachment method such as, for example, spot welding, industrial adhesive, etc. Of course, the electrical receptacle box 10 or 99 can alternatively be monolithically molded with the clamping bracket 80.

If the fragmented portion 92 has been omitted from the clamping bracket 80, as in the embodiment shown in FIGS. 6, 10, 11, and 21, the present inventors have found that an adjustable biasing feature can still be incorporated into the device by forming the clamping bracket 80 from a material which is deformable and pliable to some degree, but which still retains a degree of springiness after deformation. Many common metals possess this quality. With such a material, the first and second leg members 82 and 84 can be manually squeezed by the electrician/installer toward or away from one another to accommodate varying widths of structural components, while still retaining the clamping action described above.

While the present invention has been described by way of a detailed description of a particularly preferred embodiment or embodiments, it will be apparent to those of ordinary skill in the art that various substitutions of equivalents may be effected without departing from the spirit or scope of the invention as set forth in the appended claims.

We claim:

1. An electrical receptacle box for mounting in an aperture of a wall member of a structure, said electrical receptacle box being for receiving and at least partially enclosing at least one electrical component and for positioning such at least one electrical component within such aperture with respect to such wall member of such structure, such wall member of such structure having a front wall surface and a rear wall surface, said electrical receptacle box comprising:

a box, said box including a plurality of box panels interconnected to define and at least partially enclose a chamber for mounting such at least one electrical component therein; and positioning means for positioning said box within such aperture with respect to such wall member, said positioning means including:

front contact positioning means for contacting such front wall surface of such wall member to thereby position said box with respect to such wall member; and rear contact positioning means for contacting such rear wall surface of such wall member to thereby position said box with respect to such wall member.

2. An electrical receptacle box according to claim 1, wherein:

said plurality of box panels includes at least one lateral box panel extending substantially perpendicular to such front wall surface of such wall member when said electrical receptacle box is positioned within such aperture of such wall member; and said front contact positioning means includes at least one translatable tab member connected to said at least one lateral box panel;

said at least one translatable tab member having a wall front contact surface and being translatable between a first position and a second position with respect to said at least one lateral box panel;

said wall front contact surface of said at least one translatable tab member, in said first position, being in substantial non-contact with such front wall surface of such wall member when said box is positioned within such aperture of said wall member; and said wall front contact surface of said at least one translatable tab member, in said second position, being in substantial contact with such front wall surface when said box is positioned within such aperture of such wall member.

3. An electrical receptacle box according to claim 2, wherein:

said at least one translatable tab member is translatable in a direction substantially parallel to such front wall surface of such wall member when said box is positioned within such aperture of such wall member.

4. An electrical receptacle box according to claim 3, wherein said front contact positioning means additionally includes:

at least one elongated slot formed in said at least one translatable tab member; and at least one pin member extending from said box;

said at least one elongated slot engaging said at least one pin member;

whereby said at least one translatable tab member is rendered translatable with respect to said box through translation of said at least one elongated slot with respect to said at least one pin member.

5. An electrical receptacle box according to claim 3, wherein said front contact positioning means additionally includes:

a pair of elongated slots formed in said at least one translatable tab member; and a pair of pin members extending from said box;

one each of said pair of elongated slots engaging one each of said pair of pin members;

whereby said at least one translatable tab member is rendered translatable with respect to said box through translation of said pair of elongated slots with respect to pair of pin members.

6. An electrical receptacle box according to claim 5, wherein:

said plurality of box panels includes a top box panel, a bottom box panel, a first side panel, and a second side panel;

each of said top box panel, said bottom box panel, said first side panel, and said second side panel extending substantially perpendicular to such front wall surface of such wall member when said box is positioned in such aperture of such wall member;

said front contact positioning means additionally includes:

a first pair of said pin members extending from said top box panel;

a top translatable tab member, said top translatable tab member having a first two elongated slots formed therein;

one each of said first two elongated slots slidably engaging one each of said first pair of pin members extending from said top box panel;

a second pair of said pin members extending from said bottom box panel; and a bottom translatable tab member, said bottom translatable tab member having a second two elongated slots formed therein;

one each of said second two elongated slots slidably engaging one each of said second pair of pin members extending from said bottom box panel.

7. An electrical receptacle box according to claim 6, wherein:

each of said top box panel and said bottom box panel are provided with an attachment hole for attachment of such at least one electrical component thereto;

said first pair of said pin members and said first two elongated slots formed in said top translatable tab member straddle said attachment hole provided in said top box panel; and said second pair of said pin members and said second two elongated slots formed in said bottom translatable tab member straddle said attachment hole provided in said bottom box panel.

8. An electrical receptacle box according to claim 7, wherein:

each of said top and bottom translatable tab members are provided with a relieved portion;

said relieved portion exposing said attachment holes provided in said top and bottom box panels when said top and bottom tab members are translated to said second position in substantial contact with such front wall surface of such wall member.

9. An electrical receptacle box according to claim 8, wherein:

each of said relieved portions includes an arcuate relieved portion; and each of said pin members includes a screw.

10. An electrical receptacle box according to claim 2, wherein:

said at least one translatable tab member is translatable in a direction substantially perpendicular to such front wall surface of such wall member when said box is positioned within such aperture of such wall member.

11. An electrical receptacle box according to claim 10, wherein said front contact positioning means additionally includes:

at least one prong member extending from said at least one translatable tab member;

said at least one prong member extending substantially perpendicular to said wall front contact surface of said at least one translatable tab member; and at least one slot formed in said box for receiving said at least one prong member.

12. An electrical receptacle box according to claim 11, wherein:

said plurality of box panels includes a top box panel, a bottom box panel, a first side panel, and a second side panel;

each of said top box panel, said bottom box panel, said first side panel, and said second side panel extending substantially perpendicular to such front wall surface of such wall member when said box is positioned in such aperture of such wall member; and said front contact positioning means additionally includes:

a first pair of said slots provided in said top box panel;

a top translatable tab member, said top translatable tab member having a first pair of said prongs extending therefrom substantially perpendicular to said wall front contact surface;

one each of said first pair of prongs slidably engaging one each of said first pair of said slots provided in said top box panel;

a second pair of said slots provided in said bottom box panel; and a bottom translatable tab member, said bottom translatable tab member having a second pair of said prongs extending therefrom substantially perpendicular to said wall front contact surface;

one each of said second pair of prongs slidably engaging said second pair of slots provided in said bottom box panel.

13. An electrical receptacle box according to claim 12, wherein:

each of said top box panel and said bottom box panel are provided with an attachment hole for attachment of such at least one electrical component thereto;

said first pair of said slots and said first pair of said prongs extending from said top translatable tab member straddle said attachment hole provided in said top box panel; and said second pair of said slots and said second pair of said prongs extending from said bottom translatable tab member straddle said attachment hole provided in said bottom box panel.

14. An electrical receptacle box according to claim 13, wherein:

each of said top and bottom translatable tab members are provided with a relieved portion exposing said attachment holes provided in said top and bottom box panels.

15. An electrical receptacle box according to claim 14, wherein each of said relieved portions includes a substantially arcuate relieved portion.

16. An electrical receptacle box according to claim 12, wherein each of said prongs has a substantially corrugated surface configuration.

17. An electrical receptacle box according to claim 11, wherein said electrical receptacle box includes means for housing a plurality of electrical components.

18. An electrical receptacle box according to claim 1, wherein said electrical receptacle box includes means for housing a plurality of electrical components.

19. An electrical receptacle box according to claim 1, wherein:

said plurality of box panels includes at least one lateral box panel extending substantially perpendicular to such front wall surface of such wall member when said electrical receptacle box is positioned within such aperture of such wall member; and said rear contact positioning means includes:
a threaded member engaging and extending along said at least one lateral box panel; and
a rear contacting member threadingly engaging said threaded member;
said rear contacting member having a rear contact surface for contacting such rear wall surface of such wall member.

20. An electrical receptacle box according to claim 19, wherein:

said at least one lateral box panel includes an interior surface facing such at least one electrical component and an exterior surface opposite said interior surface;

said threaded member extends substantially along said exterior surface of said at least one lateral box panel;

said box additionally includes a flange connected to and extending from said at least one lateral box panel;

said flange is provided with an aperture;

said threaded member passes through said aperture to thereby rotatably engage said flange; and said rear contacting member includes a wing portion extending radially outward from said threaded member when said rear contacting member is threadingly engaged with said threaded member.

21. An electrical receptacle box according to claim 20, wherein:

said aperture is a substantially keyhole shaped aperture formed in said flange, said keyhole shaped aperture having a substantially cylindrical portion and a slot portion, said slot portion connecting said substantially cylindrical portion of said aperture to an exterior edge of said flange; and said threaded member includes a spool portion having a substantially cylindrical exterior surface;

said spool portion of said threaded member being snapably insertable into said aperture through said slot portion such that said substantially cylindrical exterior surface of said spool portion is rotatable within said substantially cylindrical portion of said aperture.

22. An electrical receptacle box according to claim 20, wherein:

said threaded member extends substantially parallel to said exterior surface of said at least one lateral box panel; and said threaded member is a screw member, said screw member having a head with a tool engaging configuration.

23. An electrical receptacle box according to claim 19, wherein said rear contact positioning means additionally includes means for maintaining said rear contacting member in a position substantially transverse to said at least one lateral box panel.

24. An electrical receptacle box according to claim 23, wherein said means for maintaining said rear contacting member in a position substantially transverse to said at least one box lateral panel includes a raised bead extending along said at least one lateral box panel adjacent to said threaded member.

25. An electrical receptacle box according to claim 19, wherein:

said plurality of box panels includes at least an upper box panel and a lower box panel, each of said upper box panel and said lower box panel extending substantially perpendicular to such front wall surface of such wall member when said electrical receptacle box is positioned within such aperture of such wall member; and said rear contact positioning means additionally includes:
a first threaded member rotatably engaging and extending along said upper box panel;
a first rear contacting member threadingly engaging said first threaded member;
a second threaded member rotatably engaging and extending along said lower box panel; and
a second rear contacting member threadingly engaging said second threaded member.

26. An electrical receptacle box according to claim 19, wherein:

said electrical receptacle box additionally includes means for the receiving and at least partially enclosing of a plurality of electrical components;

said plurality of box panels includes at least an upper box panel and a lower box panel, each of said upper box panel and said lower box panel extending substantially perpendicular to such front wall surface of such wall member when said electrical receptacle box is positioned within such aperture of such wall member; and said rear contact positioning means additionally includes:
a first pair of threaded members and a first pair of rear contacting members, one each of said first pair of rear contacting members threadingly engaging one each of said first pair of threaded members;
said first pair of threaded members rotatably engaging and extending along said upper box panel; and
a second pair of threaded members and a second pair of rear contacting members, one each of said second pair of rear contacting members threadingly engaging one each of said second pair of threaded members;
said second pair of threaded members rotatably engaging and extending along said lower box panel;
one each of said first pairs of threaded members and rear contacting members being disposed substantially adjacent opposing ends of said upper box panel; and
one each of said second pairs of threaded members and rear contacting members being disposed substantially adjacent opposing ends of said lower box panel.

27. A bracket for mounting an electrical receptacle box to a structure, comprising:
a clamping bracket for engaging opposing faces of a structural component of such structure and for exerting a clamping force on such structural component;
said clamping bracket being slidable along such structural component while said clamping bracket exerts said clamping force on such structural component prior to said clamping bracket being fixedly secured to such structural component;
said clamping bracket including a first leg member and a second leg member opposing said first leg member;
at least a portion of one of said first leg member and second leg member having an adjustable biasing portion;
said adjustable biasing portion being deflectable in a direction toward an other of said first leg member and said second leg member to thereby define a variable clamping gap between said adjustable biasing portion and said other of said first leg member and said second leg member;
said adjustable biasing portion and the other of said first leg member and said second leg member exerting said clamping force on such structural component; and
means for attaching such electrical receptacle box to said clamping bracket.

28. A bracket for mounting an electrical receptacle box to a structure according to claim 27, wherein:
said adjustable biasing portion includes a fragmented portion of said one of said first and second leg members.

29. A bracket for mounting an electrical receptacle box to a structure according to claim 28, wherein:
said fragmented portion includes a portion of said one of said first and second leg members fragmented therefrom by a throughgoing cut.

30. A bracket for mounting an electrical receptacle box to a structure according to claim 29, wherein:
said throughgoing cut includes three cut portions;

said three cut portions including a first cut portion; a second cut portion disposed substantially parallel to said first cut portion, and a third cut portion disposed substantially perpendicular to both of said first and second cut portions, said third cut portion interconnecting both of said first and second cut portions.

31. A device for mounting an electrical component to a structure according to claim 27, wherein:
said means for attaching such electrical receptacle box to said clamping bracket includes a flange member extending from said second leg member; and
an attachment between such electrical receptacle box and said flange member.

32. A device for mounting an electrical component to a structure according to claim 27, wherein:
said means for attaching such electrical receptacle box to said clamping bracket includes an attachment between such electrical receptacle box and said second leg member.

33. A bracket for mounting an electrical receptacle box to a structure according to claim 27, said bracket additionally including offset means for offsetting such attached electrical receptacle box a distance from such structural member.

34. A bracket for mounting an electrical receptacle box to a structure according to claim 33, wherein said offset means includes at least one step formed in said second leg member.

35. A device for mounting an electrical component to a structure, comprising:
a clamping bracket for engaging opposing faces of a structural component of such structure and for exerting a clamping force on such structural component;
said clamping bracket being slidable along such structural component while said clamping bracket exerts said clamping force on such structural component prior to said clamping bracket being fixedly secured to such structural component; and
an electrical receptacle box for attachment to said clamping bracket and for housing such electrical component;
said electrical receptacle box having a first substantially planar face; and
said clamping bracket having a second substantially planar face for mating with said first substantially planar face of said electrical receptacle box;
wherein said clamping bracket includes a first leg member and a second leg member, said first and second leg members being biased toward one another to thereby exert said clamping force on such structural component;
wherein said device for mounting additionally includes a flange member extending from said second leg member; and
wherein said electrical receptacle box is fixedly attached to at least one of said second leg member and said flange member.

36. A device for mounting an electrical component to a structure according to claim 35, wherein said electrical receptacle box is fixedly attached to both of said second leg member and said flange member.

37. A device for mounting an electrical component to a structure according to claim 36, wherein said flange member extends substantially perpendicularly outward from said second leg member.

38. A device for mounting an electrical component to a structure, comprising:
a clamping bracket for engaging opposing faces of a structural component of such structure and for exerting a clamping force on such structural component;

said clamping bracket being slidable along such structural component while said clamping bracket exerts said clamping force on such structural component prior to said clamping bracket being fixedly secured to such structural component;

said clamping bracket having at least one leg member extending along at least a portion of a side of such structural component;

said at least one leg member having a substantially planar face; and an electrical receptacle box attached to said clamping bracket;

said electrical receptacle box having another substantially planar face for mating with said substantially planar face of said at least one leg member; and said device additionally including spacing means for spacing said electrical receptacle box at a distance from said at least one leg member of said clamping bracket;

wherein said spacing means includes a portion of said at least one leg member projecting outward from a surface of said leg member which extends substantially parallel to such side of such structural component.

* * * * *